US012424787B2

(12) United States Patent
Kataoka et al.

(10) Patent No.: US 12,424,787 B2
(45) Date of Patent: Sep. 23, 2025

(54) DUMMY PLUG AND DUMMY PLUG STRUCTURE

(71) Applicant: SUMITOMO WIRING SYSTEMS, LTD., Mie (JP)

(72) Inventors: Daisuke Kataoka, Mie (JP); Junya Matsuura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 400 days.

(21) Appl. No.: 17/914,214

(22) PCT Filed: Mar. 8, 2021

(86) PCT No.: PCT/JP2021/008851
§ 371 (c)(1),
(2) Date: Sep. 23, 2022

(87) PCT Pub. No.: WO2021/192940
PCT Pub. Date: Sep. 30, 2021

(65) Prior Publication Data

US 2023/0114179 A1 Apr. 13, 2023

(30) Foreign Application Priority Data

Mar. 27, 2020 (JP) ................................ 2020-057009

(51) Int. Cl.
*H01R 13/52* (2006.01)

(52) U.S. Cl.
CPC ..... *H01R 13/5202* (2013.01); *H01R 13/5216* (2013.01)

(58) Field of Classification Search
CPC ............ H01R 13/5202; H01R 13/5216; H01R 13/5205; H01R 13/502; H01R 13/521; H01R 13/443
See application file for complete search history.

(56) References Cited

U.S. PATENT DOCUMENTS 5,562,494 A * 10/1996 Fujiwara ............ H01R 13/5205 439/275
6,039,685 A * 3/2000 Bushek ................ H04R 25/606 381/322
(Continued)

FOREIGN PATENT DOCUMENTS

JP 2001-357927 A 12/2001
JP 2004-063179 A 2/2004
(Continued)

OTHER PUBLICATIONS

International Search Report issued on May 25, 2021 for WO 2021/192940 A1 (4 pages).

*Primary Examiner* — Abdullah A Riyami
*Assistant Examiner* — Nader J Alhawamdeh
(74) *Attorney, Agent, or Firm* — Venjuris, P.C.

(57) ABSTRACT

Provided are a dummy plug and a dummy plug structure that can be automatically corrected to a proper orientation. A dummy plug (10) includes a rectangular fitting portion (12) extending in a front-rear direction. The rectangular fitting portion (12) includes four corner portions (15), at diagonal positions around an axis thereof extending in the front-rear direction. The four corner portions (15) respectively include chamfered portions (17) that spread outward away from one another while extending rearward, and whose width in a direction around the axis decreases rearward. The chamfered portions (17) respectively include ridge line portions (18) that extend in the front-rear direction and protrude outward. The ridge line portions (18) are inclined further in one direction around the axis while extending rearward.

4 Claims, 7 Drawing Sheets

(56) References Cited

U.S. PATENT DOCUMENTS

| | | | | |
|---|---|---|---|---|
| 6,409,541 | B1 * | 6/2002 | Hattori .................. | H01R 43/24 439/604 |
| 2001/0007802 | A1 * | 7/2001 | Horner ................ | H01R 13/443 439/588 |
| 2010/0136819 | A1 | 6/2010 | Mase et al. | |
| 2012/0238135 | A1 * | 9/2012 | Kataoka .............. | H01R 13/443 439/587 |
| 2014/0318198 | A1 * | 10/2014 | Gokcebay .............. | E05B 65/46 70/278.1 |
| 2023/0114179 | A1 * | 4/2023 | Kataoka ............ | H01R 13/5202 439/519 |

FOREIGN PATENT DOCUMENTS

| | | | |
|---|---|---|---|
| JP | 2007-283305 | A | 11/2007 |
| JP | 2012-216342 | A | 11/2012 |
| JP | 2013-258117 | A | 12/2013 |

* cited by examiner

DUMMY PLUG AND DUMMY PLUG STRUCTURE

CROSS REFERENCE TO RELATED APPLICATIONS

This application is a national phase of PCT application No. PCT/JP2021/008851, filed on 8 Mar. 2021, which claims priority from Japanese patent application No. 2020-057009, filed on 27 Mar. 2020, all of which are incorporated herein by reference.

TECHNICAL FIELD

The present disclosure relates to a dummy plug and a dummy plug structure.

BACKGROUND

A dummy plug disclosed in Patent Document 1 includes a main body that is elongated in the front-rear direction. The main body includes, on the front side thereof, a sealing portion having a circular cross section, and, on the rear side thereof, a rectangular fitting portion having a square cross section. An engagement portion (hereinafter, referred to as a "flange portion") protrudes from the outer periphery of the rear end of the rectangular fitting portion.

The sealing portion is inserted into a sealing hole of a housing disposed on the front side of a connector, in a liquid-tight manner. The rectangular fitting portion is fitted into a rectangular hole portion of a holder installed on the rear side of the connector. The flange portion abuts against the rear surface of the holder. As a result of the flange portion being engaged with the holder, the dummy plug is held in the holder.

A plurality of rectangular hole portions are aligned in the left-right direction in the holder. In a state where rectangular fitting portions are respectively fitted into the plurality of rectangular hole portions, the flange portions of adjacent dummy plugs are disposed close to each other on the rear surface side of the holder (see FIG. 2 in Patent Document 1). Note that techniques related to dummy plugs are also disclosed in Patent Documents 2 and 3.

PRIOR ART DOCUMENT

Patent Document

Patent Document 1: JP 2012-216342 A Patent Document 2: JP 2001-357927 A Patent Document 3: JP 2004-063179 A

SUMMARY OF THE INVENTION

Problems to be Solved

Incidentally, for example, there have been cases where, when a rectangular fitting portion is forcedly inserted into a rectangular hole portion in a state where the rectangular fitting portion is rotated about an axis thereof by 45 degrees from a proper orientation, the flange portion in the rotated orientation interferes with a flange portion in a proper orientation on the rear surface side of the holder, and the two flange portions overlap in the front-rear direction (see FIG. 8, although a structure different from the structure in Patent Document 1 is shown). At this time, the dummy plug that has the flange portion on the rear side thereof is not inserted into the connector to a proper depth, and thus the sealing portion cannot be properly inserted into the sealing hole. As a result, there is a risk that the sealability will be degraded. In order to address this, the rectangular fitting portion may be corrected to the proper orientation afterward, but this requires an extra operation to be performed separately, which is troublesome, and furthermore, there is a risk that the correcting operation itself will be forgotten.

In view of this, an object of the present disclosure is to provide a dummy plug and a dummy plug structure that can be automatically corrected to a proper orientation.

Means to Solve the Problem

A dummy plug according to the present disclosure includes a rectangular fitting portion that extends in a front-rear direction, the rectangular fitting portion including four corner portions, at diagonal positions around an axis thereof extending in the front-rear direction, the four corner portions respectively including chamfered portions that spread outward away from one another while extending rearward, and whose width in a direction around the axis decreases rearward, the four chamfered portions respectively including ridge line portions that extend in the front-rear direction and protrude outward, and the ridge line portions being inclined further to one direction around the axis while extending rearward.

A dummy plug structure according to the present disclosure includes a rectangular fitting portion that is to be fitted into a rectangular hole, the rectangular fitting portion including four corner portions at diagonal positions around an axis thereof extending in a front-rear direction, the four corner portions respectively including chamfered portions that spread outward away from one another while extending rearward, and, when positions at which the four chamfered portions come into contact with four respective side surfaces of the rectangular hole are defined as contact positions, the contact positions being set so as to be displaced further in one direction around the axis toward rear ends of the four chamfered portions.

Effect of the Invention

According to the present disclosure, it is possible to provide a dummy plug and a dummy plug structure that can be automatically corrected to a proper orientation.

DETAILED DESCRIPTION TO EXECUTE THE INVENTION

Description of Embodiments of Disclosure

Figure 1:
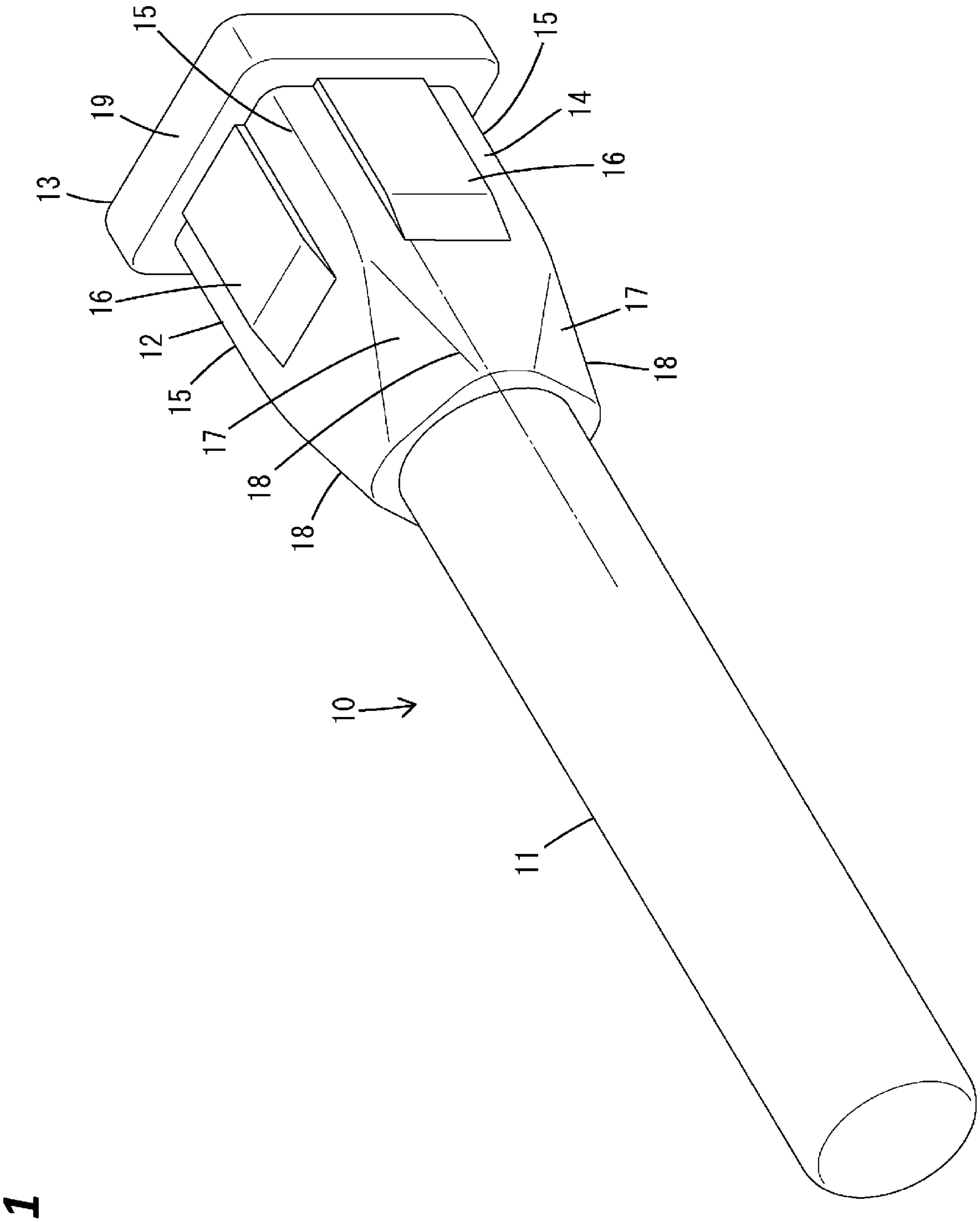
FIG. 1 is a perspective view of a dummy plug according to a first embodiment.

First, embodiments of the present disclosure will be listed and described.

(1) A dummy plug according to the present disclosure includes a rectangular fitting portion that extends in a front-rear direction, the rectangular fitting portion including four corner portions, at diagonal positions around an axis thereof extending in the front-rear direction, the four corner portions respectively including chamfered portions that spread outward away from one another while extending rearward, and whose width in a direction around the axis decreases rearward, the four chamfered portions respectively including ridge line portions that extend in the front-rear direction and protrude outward, and the ridge line portions being inclined further to one direction around the axis while extending rearward.

With this configuration, for example, when the rectangular fitting portion is inserted into the rectangular hole in a state where the dummy plug is rotated about the axis out of a proper orientation, the ridge line portions of the four chamfered portions can come into contact with the four side surfaces of the rectangular hole, respectively. When the rectangular fitting portion is further inserted from this state, it is possible to maintain a state where the ridge line portions are in contact with the side surfaces since the four corner portions spread outward toward one another while extending rearward. The dummy plug can rotate in the rectangular hole about the axis in one direction, in which the ridge line portions are inclined. Thus, as a result of the rectangular fitting portion being further inserted, the dummy plug can be automatically corrected to the proper orientation.

(2) Moreover, a dummy plug structure according to the present disclosure includes a rectangular fitting portion that is to be fitted into a rectangular hole, the rectangular fitting portion including four corner portions at diagonal positions around an axis thereof extending in a front-rear direction, the four corner portions respectively including chamfered portions that spread outward away from one another while extending rearward, and, when positions at which the four chamfered portions come into contact with four respective side surfaces of the rectangular hole are defined as contact positions, the contact positions being set so as to be displaced further in one direction around the axis toward rear ends of the four chamfered portions.

With this configuration, when the rectangular fitting portion is inserted into the rectangular hole in a state where the dummy plug is rotated about the axis out of a proper orientation, the contact positions of the four chamfered portions can be displaced further in one direction around the axis as the rectangular fitting portion is further inserted. The dummy plug can rotate in the rectangular hole as the contact positions are displaced. Thus, as a result of the rectangular fitting portion being further inserted, the dummy plug can be automatically corrected to the proper orientation.

(3) Preferably, the four chamfered portions each include a surface inclined in one direction positioned in a region extending from the contact position in the one direction around the axis and a surface inclined in another direction positioned in a region extending from the contact position in a direction opposite to the one direction around the axis, and an angle formed between a tangent line on the surface inclined in the one direction at the contact position and the side surface is larger than an angle formed between a tangent line on the surface inclined in the other direction at the contact position and the side surface.

With this configuration, when the rectangular fitting portion is inserted into the rectangular hole in a state where the dummy plug is rotated around the axis from the proper orientation, and the four chamfered portions are subjected to reaction forces at the contact positions from the side surfaces of the rectangular hole, it is possible to make a component force directed to the surface inclined in the one direction larger than a component force directed to the surface inclined in the other direction. Therefore, it is possible to reliably displace the contact positions in the one direction around the axis as the rectangular fitting portion is further inserted.

(4) Preferably, a width of the chamfered portion in a direction around the axis is set to decrease rearward.

With this configuration, as the rectangular fitting portion is further inserted, the surfaces inclined in the one direction of the rectangular fitting portion approach the side surfaces of the rectangular hole, and it is possible to gradually close the gaps between the surfaces inclined in the one direction of the rectangular fitting portion and the side surfaces of the rectangular hole. As a result, it is possible to smoothly insert the fitting portion into the rectangular hole without hindrance.

Detailed Embodiments of Present Disclosure

Specific examples of the present disclosure will be described below with reference to the drawings. Note that the present invention is not limited to illustrations of these, but is indicated by the claims, and all changes that come within the meaning and range of equivalency of the claims are intended to be embraced therein.

First Embodiment

Figure 6:
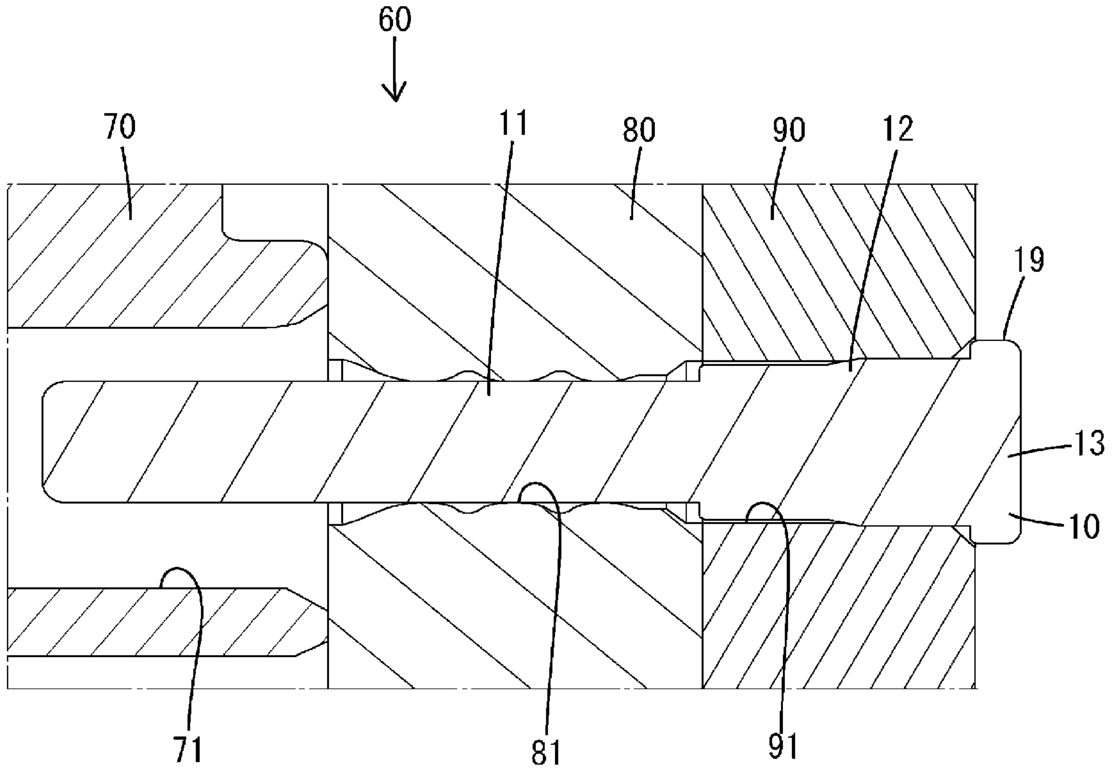
FIG. 6 is a side cross-sectional view of the dummy plug showing a state where the dummy plug has reached the proper insertion position, and a sealing portion is properly inserted into a sealing hole.

A dummy plug 10 according to a first embodiment is provided in a water-proof connector 60. As shown in FIG. 6, the water-proof connector 60 includes a housing 70, a collective rubber plug 80, and a holder 90, in addition to the dummy plug 10.

The housing 70 is made of a synthetic resin, and has a block shape as a whole. The housing 70 has a plurality of cavities 71 (FIG. 6 shows only one) extending therethrough in the front-rear direction (left-right direction in FIG. 6). Each of the cavities 71 can accommodate a terminal fitting (not illustrated).

The collective rubber plug 80 is made of a rubber such as silicon rubber, has a mat-like shape, and has a thickness in the front-rear direction. The collective rubber plug 80 is disposed such that the front surface (left side surface in FIG. 6) thereof comes in close contact with the rear surface of the housing 70. The collective rubber plug 80 includes a plurality of sealing holes 81 (FIG. 6 shows only one). Each sealing hole 81 has a circular cross section, and is disposed in communication with the cavity 71.

The holder 90 is made of a synthetic resin, has a plate shape, and has a thickness in the front-rear direction. The holder 90 abuts against the rear surface of the collective rubber plug 80, and is engaged with the housing 70. As a result of the holder 90 being engaged with the housing 70, the collective rubber plug 80 is sandwiched between the housing 70 and the holder 90. This prevents the collective rubber plug 80 from coming loose from the housing 70. The holder 90 includes a plurality of rectangular holes 91 (FIG. 6 shows only one). Each of the rectangular holes 91 has a quadrangular cross section (square cross section or rectangular cross section), and is disposed in communication with the sealing hole 81 and the cavity 71.

Figure 3:
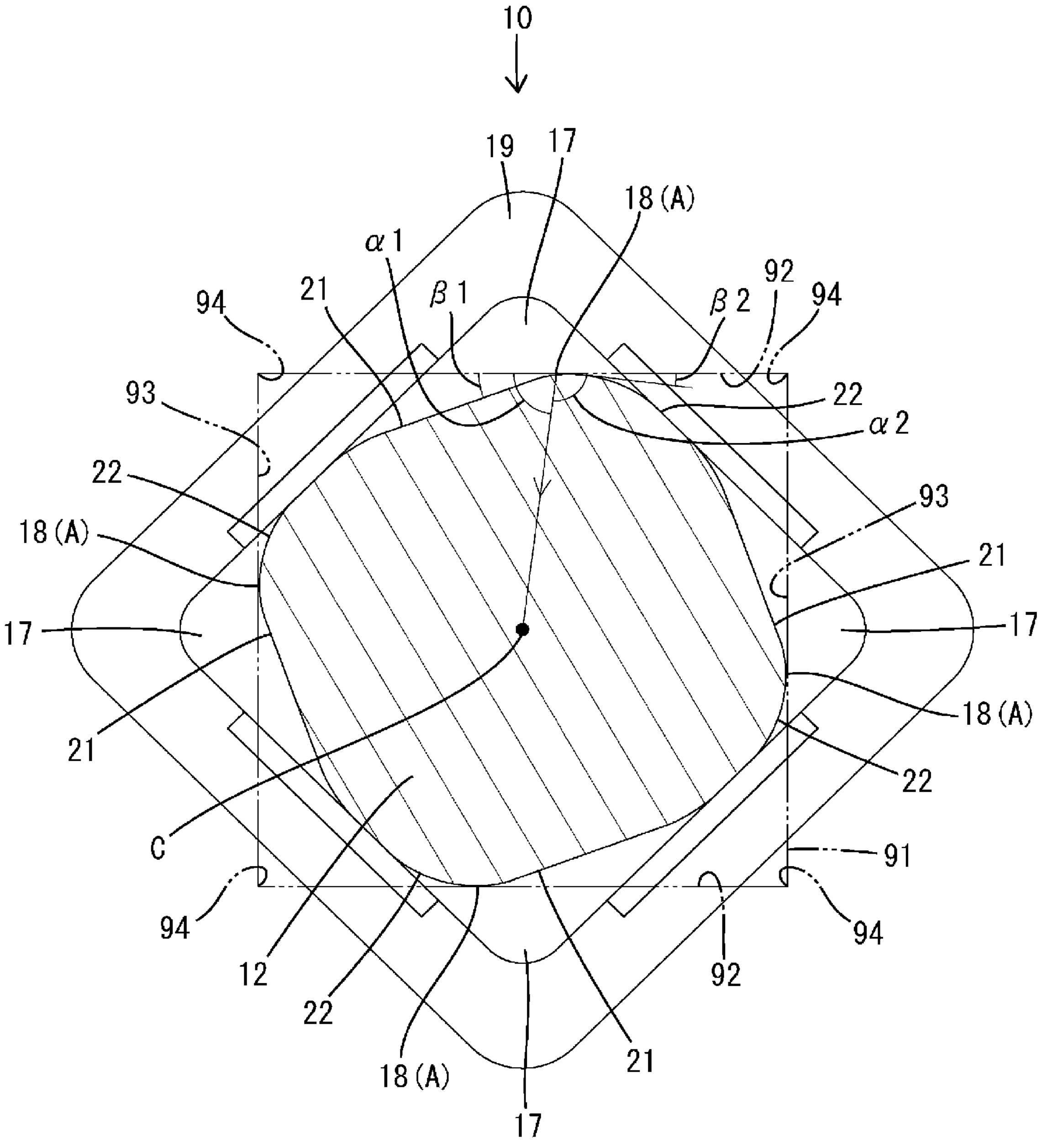
FIG. 3 is a transverse cross-sectional view of the dummy plug showing a state where the dummy plug is rotated about the axis thereof by 45 degrees from a proper orientation, and a rectangular fitting portion is about to be inserted into a rectangular hole.

As shown in FIG. 3, the inner surfaces of the rectangular hole 91 of the holder 90 consist of four side surfaces 92 and 93. The four side surfaces 92 and 93 include a pair of side surfaces 92 that oppose each other in the up-down direction (the height direction) and are parallel to each other, and a pair of side surfaces 93 that oppose each other in the left-right direction (width direction) and are parallel to each other. The side surfaces 92 and 93 are continuous, with internal corner portions 94 positioned therebetween at four corners of the rectangular hole 91 forming right angles.

Each dummy plug 10 is made of a synthetic resin, and, as shown in FIG. 1, has a shape that is elongated in the front-rear direction as a whole. The dummy plug 10 includes a columnar sealing portion 11, a rectangular block-shaped fitting portion 12 that is continuous to the rear end of the sealing portion 11, and a plate-shaped stopper portion 13 that is continuous to the rear end of the rectangular fitting portion 12. The sealing portion 11 has a circular cross section, and has an elongated shape extending in the front-rear direction. The length of the sealing portion 11 represents half or more than half the entire dummy plug 10. As shown in FIG. 6, the sealing portion 11 is inserted into the sealing hole 81 of the collective rubber plug 80 in a liquid-tight manner. The dummy plug 10 waterproofs the inside of the cavity 71 into which a terminal fitting is not inserted, using the sealing portion 11.

As shown in FIG. 1, the rectangular fitting portion 12 includes, on the rear side thereof, a main body 14 having a quadrangular cross section (square cross section or rectangular cross section). The main body 14 includes corner portions 15 at the four corners thereof, which are defined as diagonal positions. The main body 14 includes protrusion portions 16 having a flattened trapezoidal shape, in four side surface regions each positioned between adjacent corner portions 15. The flat end surfaces of the protrusion portions 16 are disposed so as to face and abut against the side surfaces 92 and 93 of the rectangular hole 91 of the holder 90 when the dummy plug 10 reaches a proper insertion position.

The front portion of the rectangular fitting portion 12 has a basic shape with a quadrangular cross section that is constant from the main body 14, and is provided with notch-like chamfered portions 17 at the four corner portions 15. The front surface on the front side of the rectangular fitting portion 12 is disposed along the radial direction, and is continuous to the outer circumferential surface of the sealing portion 11 in a step-like manner.

Figure 4:
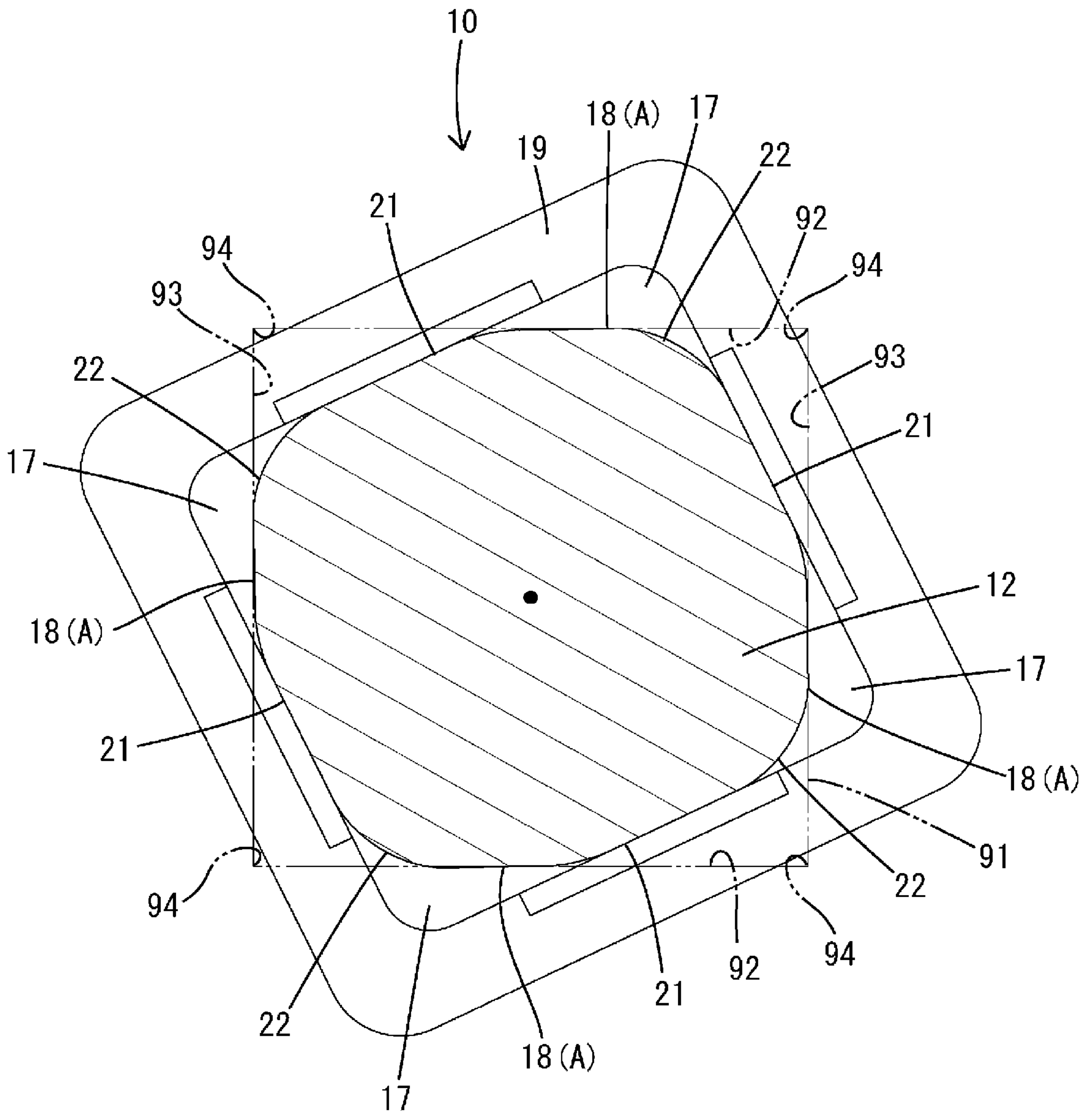
FIG. 4 is a transverse cross-sectional view of the dummy plug showing a state where the rectangular fitting portion is inserted into the rectangular hole in continuation of the state shown in FIG. 3.
Figure 5:
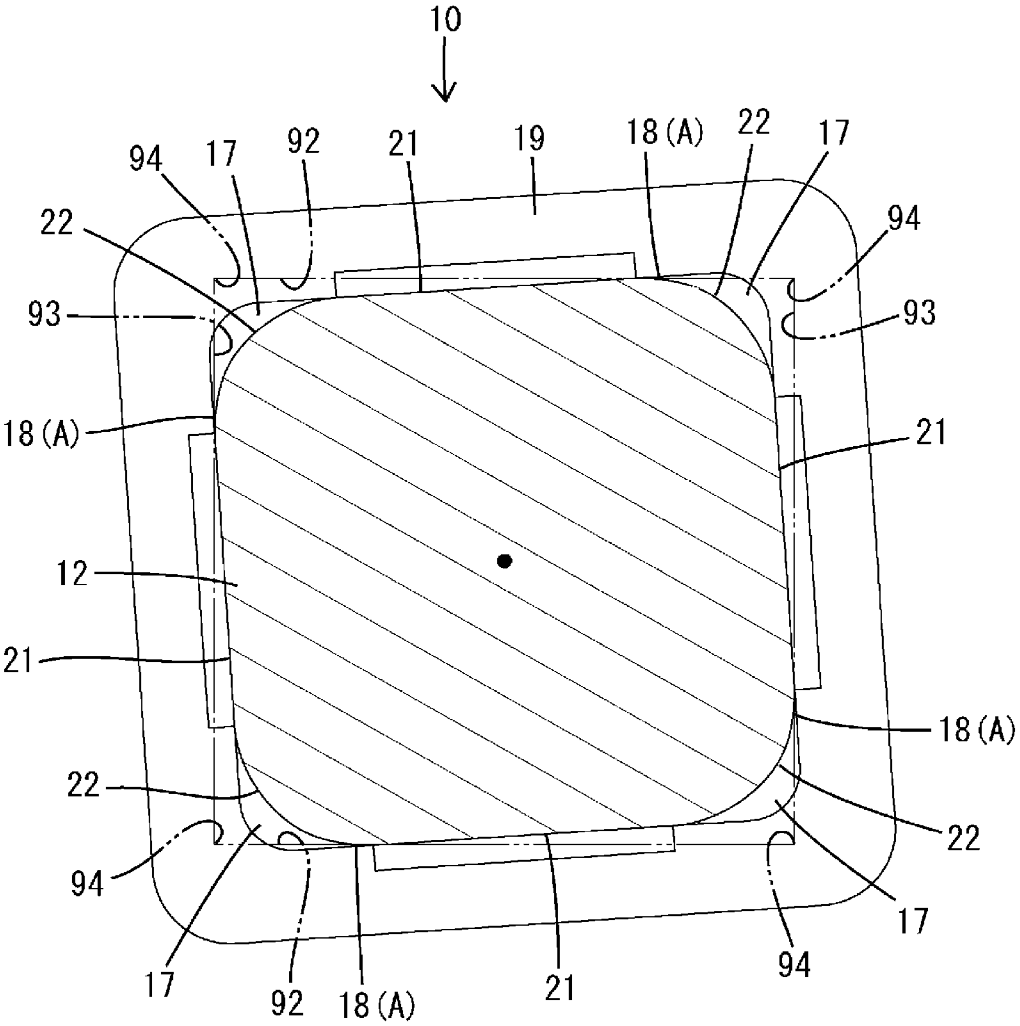
FIG. 5 is a transverse cross-sectional view of the dummy plug showing a state where the rectangular fitting portion has been further inserted in continuation from the state shown in FIG. 4 and the dummy plug is just about to reach a proper insertion position.

The chamfered portions 17 are inclined so as to spread outward (outward in the radial direction around the axis core of the dummy plug 10 (see the reference sign C in FIG. 3)) away from one another while extending rearward from the front ends thereof (edges continuous to the front surface on the front side of the rectangular fitting portion 12). As shown in FIGS. 3 to 5, the area of the transverse cross-sectional shape of the front portion of the rectangular fitting portion 12 gradually increases rearward due to the inclined shapes of the chamfered portions 17.

Each chamfered portion 17 is shaped such that the width in the circumferential direction (the circumferential direction around the axis of the dummy plug 10) thereof gradually decreases rearward from the front end thereof. The end portion of the chamfered portion 17 is on the front end side of the main body 14.

Figure 2:
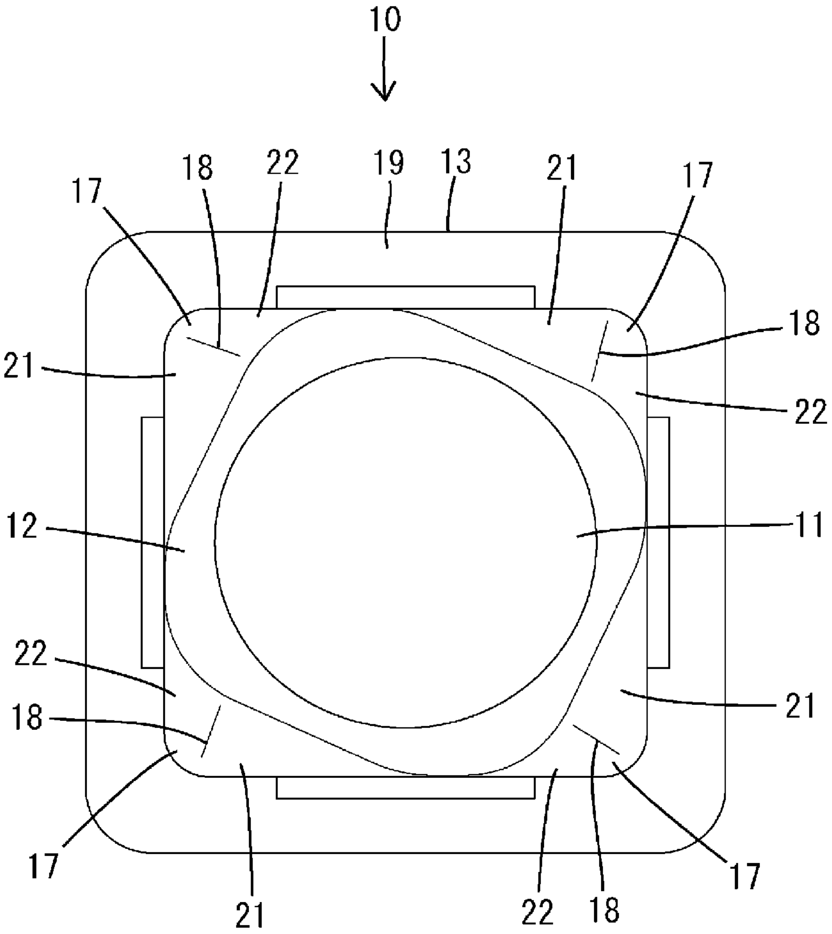
FIG. 2 is a front view of the dummy plug.

The chamfered portion 17 includes a ridge line portion 18 that extends in the front-rear direction, and also includes, on the two sides in the circumferential direction relative to the ridge line portion 18, a surface 21 inclined in one direction and a surface 22 inclined in another direction, as shown in FIGS. 2 and 3.

The ridge line portion 18 protrudes outward in a curve between the surface 21 inclined in the one direction and the surface 22 inclined in the other direction. As shown in FIG. 1, the ridge line portion 18 is inclined in one direction in the circumferential direction (the upward direction in FIG. 1) with respect to a direction parallel to the axial direction of the dummy plug 10 (see the dashed-dotted line in FIG. 1), while extending rearward from the front end of the chamfered portion 17.

As shown in FIGS. 2 and 3, in each chamfered portion 17, the surface 21 inclined in the one direction is disposed on one side in the circumferential direction relative to the ridge line portion 18 (on one direction side in the circumferential direction, in other words in the counter-clockwise direction relative to the ridge line portion 18 in FIGS. 2 and 3). As shown in FIG. 3, the surface 21 inclined in the one direction has a shape that linearly extends over a long distance from the ridge line portion 18 to the surface 22 inclined in the other direction adjacent on the one side in the circumferential direction.

As shown in FIGS. 2 and 3, in each chamfered portion 17, the surface 22 inclined in the other direction is disposed on the other side in the circumferential direction relative to the ridge line portion 18 (on the other direction side in the circumferential direction, in other words in the clockwise direction relative to the ridge line portion 18 in FIGS. 2 and 3). The surface 22 inclined in the other direction is formed in a small range in the circumferential direction compared with the surface 21 inclined in the one direction. As shown in FIG. 3, the surface 22 inclined in the other direction has a shape that extends over a short distance in a curve from the ridge line portion 18 to the surface 21 inclined in the one direction adjacent on the other side in the circumferential direction. The end portion on the other side in the circumferential direction of the surface 22 inclined in the other direction (end portion on the opposite side to the ridge line portion 18) and the end portion on the one side in the circumferential direction of the surface 21 inclined in the one direction (end portion on the opposite side to the ridge line portion 18) are continuous to each other in an arc.

As shown in FIG. 3, in the transverse cross-sectional shape of the rectangular fitting portion 12, an angle $\alpha 1$ between a line segment that connects a center C of the rectangular fitting portion 12 (the axis core of the dummy plug 10) and the ridge line portion 18, and the extending direction (tangent line direction) of the surface 21 inclined in the one direction at the ridge line portion 18 is set smaller than an angle $\alpha 2$ between the line segment that connects the center C of the rectangular fitting portion 12 and the ridge line portion 18, and the extending direction (tangent line direction) of the surface 22 inclined in the other direction at the ridge line portion 18.

As shown in FIG. 1, the stopper portion 13 has a rectangular plate shape, and has a thickness in the front-rear direction. The stopper portion 13 includes a flange portion 19 that protrudes from the outer peripheral side of the main body 14. The flange portion 19 has a quadrangular outer shape similar to the main body 14.

Next, an attachment method and an attaching structure of the dummy plug 10 will be described.

When attaching the dummy plug 10, the dummy plug is inserted into the rectangular hole 91 of the holder 90 from the rear side. The corner portions 15 on the rear side of the dummy plug 10 are disposed in correspondence with the internal corner portions 94 of the rectangular hole 91, and, when the dummy plug 10 is in a proper orientation relative to the rectangular hole 91, the sealing portion 11 is inserted into the sealing hole 81 to a proper depth where the dummy plug 10 can reach a proper insertion position, as shown in FIG. 6. When the dummy plug 10 is at the proper insertion position, the flange portion 19 abuts against the rear surface of the holder 90, and thus the dummy plug 10 is held. The entire length of the sealing portion 11 passes through the sealing hole 81, with the leading end portion of the sealing portion 11 protruding in the cavity 71. In addition, the rectangular fitting portion 12 is fitted without any gaps, in a state of being positioned in the circumferential direction in the rectangular hole 91.

Figure 7:
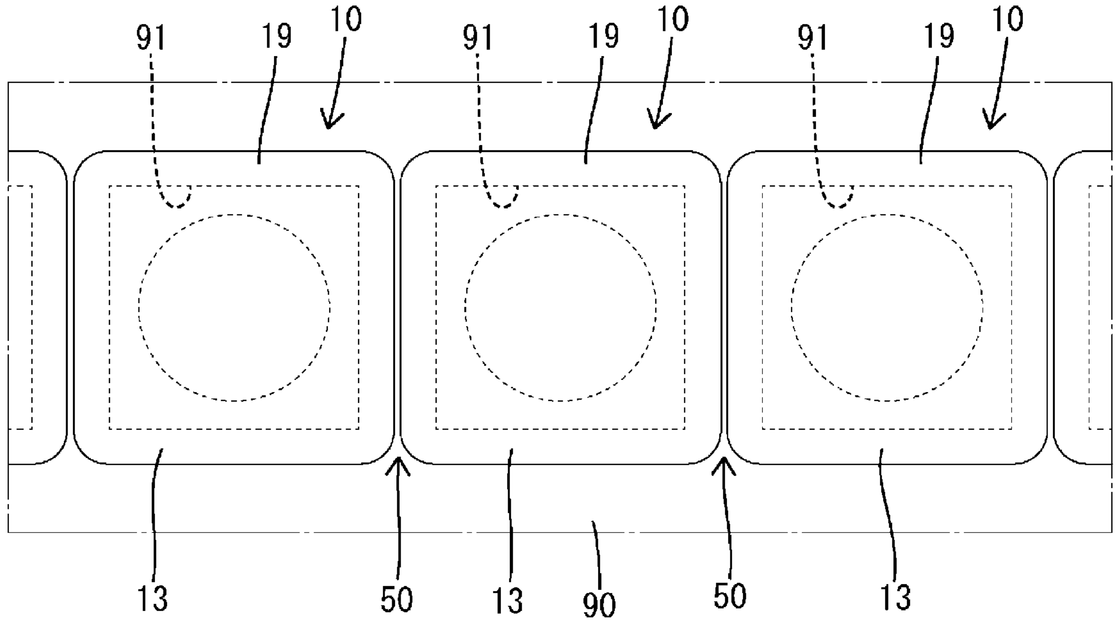
FIG. 7 is a rear view of dummy plugs that are aligned on a rear surface side of a holder.

When the plurality of dummy plugs 10 are at the proper insertion positions, the flange portions 19 of the dummy plugs 10 are aligned in the width direction on the rear surface side of the holder 90 as shown in FIG. 7. A clearance 50 extending in the up-down direction is formed between opposing side edges of flange portions 19 adjacent in the width direction, and the adjacent flange portions 19 are disposed close to each other via the clearance 50 without interfering with each other.

Figure 8:
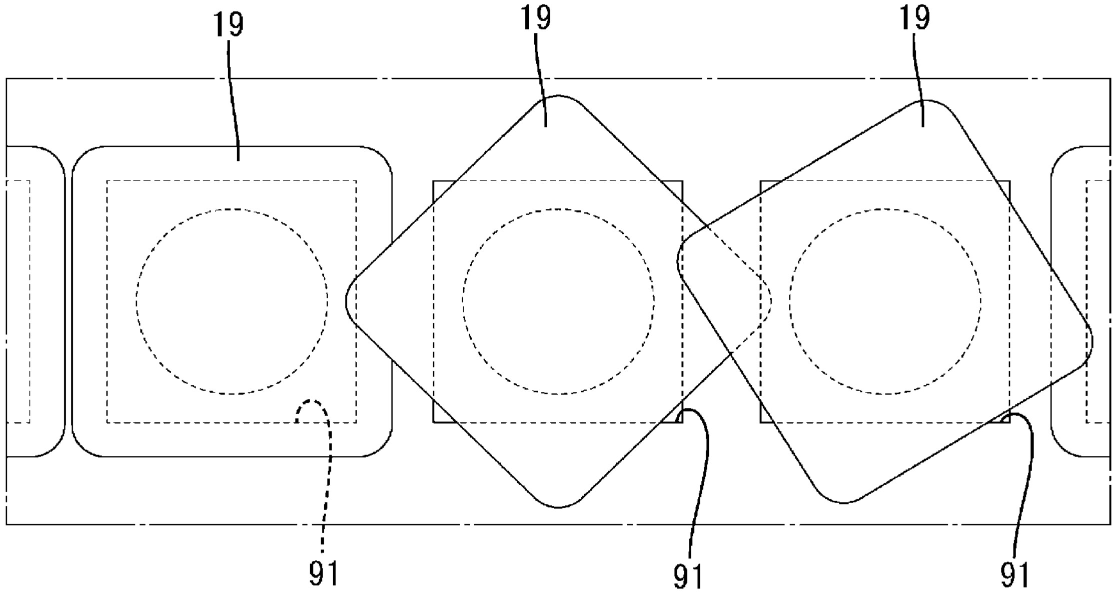
FIG. 8 is a rear view showing, as a reference example, a state where a dummy plug from among a plurality of dummy plugs aligned on the rear surface side of the holder is rotated about the axis thereof by 45 degrees.

Conventionally, for example, when a dummy plug 10 is in an orientation of being rotated about the axis thereof by 45 degrees from a proper orientation (hereinafter, an orientation of being rotated out of the proper orientation is referred to as a "tilted orientation"), and the tilted orientation is not cancelled, there has been a risk that, as shown in the reference diagram in FIG. 8, adjacent flange portions 19 will interfere with each other by overlapping in the front-rear direction, and a sealing portion 11 will not be inserted into the sealing hole 81 to the proper depth, and thus the sealability will be degraded.

In view of this, in the first embodiment, a configuration is adopted in which the tilted orientation of the dummy plug 10 is cancelled due to the chamfered shapes of the rectangular fitting portion 12. Specifically, when the rectangular fitting portion 12 is inserted into the rectangular hole 91 in a state where the dummy plug 10 is in the tilted orientation, the ridge line portions 18 of the four chamfered portions 17 come into contact with the four side surfaces 92 and 93 of the rectangular hole 91 at the same time during the insertion process, as shown in FIG. 3. Here, contact positions A of the ridge line portions 18 on the side surfaces 92 and 93 are displaced from the center in the width direction of the upper and lower side surfaces 92 and the center in the height direction of the right and left side surfaces 93, in the other direction in the circumferential direction (the clockwise direction in FIG. 3).

In the above-described state, the stopper portion 13 is pressed from behind, and a force that presses the dummy plug 10 forward into the connector 60 is applied. Then, a reaction force having a vector directed from the side surfaces 92 or 93 of the rectangular hole 91 toward the center C of the rectangular fitting portion 12 (see the arrow in FIG. 3) is exerted at the contact positions A of the ridge line portions 18. Here, an angle $\beta 1$ formed between the extending direction (tangent line direction) of the surface 21 inclined in the one direction at the contact position A and the side surface 92 or 93 is larger than an angle $\beta 2$ formed between the extending direction (tangent line direction) of the surface 22 inclined in the other direction at the contact position A and the side surface 92 or 93. Thus, the reaction forces that are exerted at the contact positions A of the ridge line portions 18 act biasedly, that is, more heavily on the surfaces 21 inclined in the one direction than the surfaces 22 inclined in the other direction. That is to say, a component force that acts on the one side in the circumferential direction (in the counter-clockwise direction in FIG. 3) on which the surface 21 inclined in the one direction is positioned is larger than a component force that acts on the other side in the circumferential direction (in the clockwise direction in FIG. 3) on which the surface 22 inclined in the other direction is positioned.

Here, the chamfered portions 17 spread away from one another while extending rearward, and the ridge line portions 18 of the chamfered portions 17 have a shape inclined further on the one side in the circumferential direction while extending rearward. Thus, when the dummy plug 10 is subjected to a force for pressing the dummy plug 10 itself into the connector 60, the ridge line portions 18 of the chamfered portions 17 slide along the side surfaces 92 and 93, thus making it possible to maintain the contact state with the side surfaces 92 and 93. The dummy plug 10 rotates about the axis core thereof on the other side in the circumferential direction as shown in FIGS. 3 and 4 as a result of the ridge line portions 18 sliding and being displaced relative to the side surfaces 92 and 93. Accordingly, the tilted orientation of the dummy plug 10 is partially cancelled.

Furthermore, as the dummy plug 10 is pressed into the connector 60 and the ridge line portions 18 slide along the side surfaces 92 and 93, the tilted orientation of the dummy plug 10 is gradually corrected to the proper orientation. When the end portions (rear end portions) of the ridge line portions 18 reach positions where they come into contact with the side surfaces 92 and 93, as shown in FIG. 5, the surfaces 21 inclined in the one direction of the chamfered portions 17 approach the side surfaces 92 and 93, and the surfaces 22 inclined in the other direction of the chamfered portions 17 oppose the internal corner portions 94 with a gap therebetween. In this manner, before reaching the proper insertion position, the orientation of the dummy plug 10 is automatically corrected to the proper orientation in conjunction with an operation of pressing the dummy plug 10 itself into the connector 60.

As described above, the four corner portions 15 of the rectangular fitting portion 12 of the dummy plug 10 according to the first embodiment respectively have the chamfered portions 17 that spread out away from one another while extending rearward, and whose width in the circumferential direction decreases rearward, the four chamfered portions 17 respectively include the ridge line portions 18 extending in the front-rear direction and protruding outward, and the ridge line portions 18 are inclined further in one direction in the circumferential direction while extending rearward. Moreover, the structure of the dummy plug 10 according to the first embodiment is set such that the four corner portions 15 of the rectangular fitting portion 12 respectively include the chamfered portions 17 that spread outward away from one another while extending rearward, and when the dummy plug 10 is in a tilted orientation, and positions at which the four chamfered portions 17 respectively come into contact with the four side surfaces 92 and 93 of the rectangular hole 91 are defined as the "contact positions A", the contact positions A are displaced further in one direction in the circumferential direction toward the rear ends of the four chamfered portions 17.

According to the first embodiment, when the rectangular fitting portion 12 is inserted into the rectangular hole 91 in a state where the dummy plug 10 is rotated about the axis thereof from the proper orientation, the ridge line portions 18 of the chamfered portions 17 slide along the side surfaces 92 and 93 on the one side in the circumferential direction and the contact positions A of the chamfered portions 17 can be displaced to one side in the circumferential direction, as the rectangular fitting portion 12 is further inserted. Accordingly, the dummy plug 10 can rotate inside the rectangular hole 91 toward the proper orientation. Thus, as a result of the rectangular fitting portion 12 being further inserted, the dummy plug 10 can be automatically corrected to the proper orientation.

In addition, in the case of the first embodiment, the angle β1 formed between the extending direction (tangent line direction) of the surface 21 inclined in the one direction at the contact position A and the side surface 92 or 93 is set to be larger than the angle β2 formed between the extending direction (tangent line direction) of the surface 22 inclined in the other direction at the contact position A and the side surface 92 or 93. Thus, when the rectangular fitting portion 12 is inserted into the rectangular hole 91 in a state where the dummy plug 10 is rotated about the axis thereof from the proper orientation, and the chamfered portions 17 are subjected to reaction forces at the contact positions A from the side surfaces 92 and 93 of the rectangular hole 91, component forces directed to the surfaces 21 inclined in the one direction can be made larger than component forces directed to the surfaces 22 inclined in the other direction. Therefore, as the rectangular fitting portion 12 is inserted further, the contact positions A can be reliably displaced to the one side in the circumferential direction.

Furthermore, in the case of the first embodiment, the width in the circumferential direction of each chamfered portion 17 is set to gradually decrease rearward. Therefore, as the rectangular fitting portion 12 is further inserted, the surfaces 21 inclined in the one direction (portions excluding the ridge line portions 18) of the rectangular fitting portion 12 approach the side surfaces 92 and 93 of the rectangular hole 91, and it is possible to gradually close the gaps between the surfaces 21 inclined in the one direction of the rectangular fitting portion 12 and the side surfaces 92 and 93 of the rectangular hole 91. As a result, the rectangular fitting portion 12 can be smoothly inserted into the rectangular hole 91 without hindrance.

Other Embodiments of Present Disclosure

The embodiments disclosed here are to be construed as illustrative and not limiting in all respects.

In the case of the above first embodiment, a configuration is adopted in which the width in the circumferential direction of each chamfered portion gradually decreases toward the rear end thereof, but as another embodiment, a configuration may also be adopted in which the width in the circumferential direction of the chamfered portion is kept constant in the front-rear direction.

In the case of the above first embodiment, each ridge line portion has a shape protruding outward in a curve, but as another embodiment, the ridge line portion may have a shape protruding outward in an angled shape (L-shape).

In the case of the above first embodiment, the rectangular fitting portion is formed in the shape of a solid rectangular column, but, as another embodiment, the rectangular fitting portion may be formed in the shape of a hollow rectangular tube. In this case, the stopper portion may be a closed wall.

In the case of the above first embodiment, the flange portion has a rectangular outer shape, but, as another embodiment, the flange portion may have a polygonal outer shape other than a circular or rectangular shape. Also, a plurality of flange portions may be provided in the circumferential direction.

LIST OF REFERENCE NUMERALS

10 Dummy plug
11 Sealing portion
12 Rectangular fitting portion
13 Stopper portion
14 Main body
15 Corner portion
16 Protrusion portion
17 Chamfered portion
18 Ridge line portion
19 Flange portion
21 Surface inclined in one direction
22 Surface inclined in other direction
50 Clearance
60 Water-proof connector
70 Housing
71 Cavity
80 Collective rubber plug
81 Sealing hole
90 Holder
91 Rectangular hole
92 Side surface (upper or lower side surface)
93 Side surface (left or right side surface)
94 Internal corner portion
A Contact position
C Center
α1 Angle between line segment that connects center of rectangular fitting portion and ridge line portion and extending direction of surface inclined in one direction at ridge line portion
60 2 Angle between line segment that connects center of rectangular fitting portion and ridge line portion and extending direction of surface inclined in other direction at ridge line portion
β1 Angle between extending direction of surface inclined in one direction at contact position and side surface
β2 Angle between extending direction of face inclined in other direction at contact position and side surface

What is claimed is:

1. A dummy plug comprising a rectangular fitting portion that extends in a front-rear direction, wherein the rectangular fitting portion includes four corner portions, at diagonal positions around an axis thereof extending in the front-rear direction, the four corner portions respectively include chamfered portions that spread outward away from one another while extending rearward, and whose width in a direction around the axis decreases rearward, the four chamfered portions respectively include ridge line portions that extend in the front-rear direction and protrude outward, and the ridge line portions are inclined further in one direction with respect to the axis while extending rearward.

2. A dummy plug structure comprising a rectangular fitting portion that is to be fitted into a rectangular hole, wherein the rectangular fitting portion includes four corner portions at diagonal positions around an axis thereof extending in a front-rear direction, the four corner portions respectively include chamfered portions that spread outward away from one another while extending rearward, and when positions at which the four chamfered portions come into contact with four respective side surfaces of the rectangular hole are defined as contact positions, the contact positions are set so as to be displaced further in one direction with respect to the axis toward rear ends of the four chamfered portions as the rectangular fitting portion is inserted into the rectangular hole.

3. The dummy plug structure according to claim 2, wherein the four chamfered portions each include a surface inclined in one direction positioned in a region extending from the contact position in the one direction around the axis and a surface inclined in another direction positioned in a region extending from the contact position in a direction opposite to the one direction around the axis, and an angle formed between a tangent line on the surface inclined in the one direction at the contact position and the side surface is larger than an angle formed between a tangent line on the surface inclined in the other direction at the contact position and the side surface.

4. The dummy plug structure according to claim 2, wherein a width of the chamfered portion in a direction around the axis is set to decrease rearward.

* * * * *